2,953,496
VITAMIN EMULSION

William A. Phillips, Kalamazoo, Mich., assignor to The Upjohn Company, Kalamazoo, Mich., a corporation of Michigan No Drawing. Filed Dec. 2, 1958, Ser. No. 777,610

2 Claims. (Cl. 167—81)

This invention relates to a multiple vitamin composition and more particularly to an oil-in-water emulsion having both fat-soluble and water-soluble vitamins dissolved therein.

The pharmaceutical art has long concerned itself with the problem of formulating compositions having uniformly dispersed therein both oil-soluble and water-soluble ingredients.

The problem confronting the pharmaceutical art has been the provision in unit dosage form of a composition containing both water-soluble vitamins and fat-soluble vitamins which are considered essential to nutrition. The provision of such a dosage form has been provided by compositions of the oil-in-water emulsion type. However, the stability of these compositions has been unsatisfactory since the composition must withstand the extreme conditions which are encountered in shipment, storage and admixture for administration.

It is, therefore, an object of the present invention to provide a pharmaceutically elegant multiple vitamin composition wherein oil- and water-soluble vitamins are uniformly and stably dispersed throughout the composition, even though subjected to extremes of temperature, gravity, solvent change, and pH change.

The foregoing and additional objects have been accomplished by the provision of a multiple vitamin composition consisting of a stable, fluid, oil-in-water emulsion having an oil dispersed phase and an aqueous continuous phase, said composition comprising (1) from about 0.5% to about 2% w./v. of a solution of a nontoxic, orally acceptable, fixed oil and at least one oil-soluble vitamin, (2) from about 50 to about 80% v./v. of glycerin, (3) a solution of water and at least one water-soluble vitamin, and (4) from about 0.75% to about 2% w./v. of an emulsifier comprising (a) an ethylene oxide-polypropylene glycol condensation product wherein the molecular weight of the polypropylene base unit is at least 800 and the ethylene oxide constitutes between 60 and 80% by weight of the molecule and (b) a member selected from the group consisting of sorbitan monooleate, sorbitan monolaurate, and polyoxyethylene lauryl ether.

The oil phase can be any nontoxic, orally-acceptable animal or vegetable oil. For example, corn, coconut, peanut, cottonseed, sesame, shark liver, halibut liver, and like oils are suitable as solvents for the fat-soluble vitamins. Of these, corn oil and coconut oil are preferred. The preferred concentrations are from about 0.5 to about 2%. This concentration is dependent upon the amount of the vitamins to be dissolved. The fat-soluble vitamins which can be dissolved in the emulsified oil phase are vitamins A, D, E and K and the esters thereof. Obviously, almost any therapeutically desirable quantities of these vitamins are suitable.

The external phase comprises an aqueous solution of glycerin and water-soluble vitamin or vitamins. The preferred concentration of glycerin is from about 50 to about 80% v./v. of the composition. Glycerin can be partially or wholly replaced by polyethylene glycol 400, sucrose, methyl α-d-glucoside, polyoxyethylene sorbitol (Atlas G-2240), and the like. A minor proportion of propylene glycol can be used to replace part of the glycerin, for example, up to 10% of the composition.

The water-soluble vitamins which can be utilized in the composition include thiamine hydrochloride, riboflavin, pantothenyl alcohol, nicotinamide, pyridoxine hydrochloride, ascorbic acid, cyanocobalamin, and the like. Other water-soluble derivatives of these vitamins are also suitable.

The emulsifier of the present invention comprises (a) an ethylene oxide-polypropylene glycol condensation product and (b) a member selected from the group consisting of sorbitan monooleate, sorbitan monolaurate and polyoxyethylene lauryl ether. The ethylene oxide-polypropylene glycol condensate comprises from about 60% to about 80% ethylene oxide condensed on a polyoxypropylene polymer, said polyoxypropylene polymer being of average molecular weight of about 900 to about 2500. Illustrative of such condensates are Pluronics P-46, F-77, F-38 and F-68, sold by the Wyandotte Chemical Company. The preferred ethylene oxide-polypropylene glycol condensate comprises about 80% ethylene oxide condensed on a polyoxypropylene polymer, said polyoxypropylene polymer being of an average molecular weight of about 1501 to about 1800 and can be represented by the following formula:

wherein $b$ is about 25 to 32 and a plus $c$ is about 136 to 138, the molecular weight being about 8000. Atlas Powder Company products known as Span 80, Span 20 and Brij 30 are illustrative of the coemulsifiers identified under the letter (b). The emulsifier components should preferably comprise from about .75% to about 2% w./v. of the composition. The ratio of the ethylene oxide-polypropylene glycol condensation product to the other emulsifying components is important. Expressed as a ratio of the percentage concentrations of each ingredient a ratio in excess of .47 is satisfactory, and a ratio between 1.5 and 4.0 is preferred.

Conventional flavors, sweeteners, and preservatives can also be added. Suitable preservatives include methyl paraben, propyl paraben, and phenyl mercuric nitrate.

The composition can be prepared by dissolving the oil-soluble vitamins and the emulsifier in the selected oil. The water-soluble vitamins, glycerin, flavors, sweeteners, and preservatives are dissolved in the water. The two solutions are then mixed together by conventional means until an emulsion results.

The compositions prepared according to the present invention have been found to be stable when exposed to such extreme conditions as autoclaving at fifteen pounds pressure for twenty minutes, freezing at the temperature of a Dry Ice-acetone slush, and increased gravity encountered by centrifuging at 2500 revolutions per minute for two and one-half hours. The compositions are stable to changes of pH as would result by the change of concentration of the water-soluble vitamin acid salts or by dispersing in such acidic media as orange juice prior to administration. Also, the compositions do not separate when mixed with water, milk, or baby formulae for administration to infants. This exceptional stability to solvent change is particularly desirable when infant formulae are to be fortified by the multiple vitamin compositions of the present invention and sterilized at boiling temperatures and later stored in a cold refrigerator prior to administration.

The following examples are illustrative of the processes and products of this invention and are not to be construed as limiting.

EXAMPLE 1

1000 cc. of the composition of the present invention are prepared from the following types and amounts of ingredients:

| Ingredient | | Amount |
|---|---|---|
| Vitamin A palmitate | gm | 5.55 |
| Vitamin D₃ | mg | 42 |
| Corn oil | gm | 5.4 |
| Riboflavin | gm | 1.66 |
| Thiamine hydrochloride | gm | 1.66 |
| Pantothenyl alcohol | gm | 5 |
| Nicotinamide | gm | 16.66 |
| Pyridoxine hydrochloride | gm | 1.66 |
| Ascorbic acid | gm | 83.33 |
| Cyanocobalamin | mg | 1.66 |
| Pluronic F–68 | gm | 7.5 |
| Sorbitan monooleate | gm | 3.5 |
| Saccharin sodium | gm | 0.5 |
| Preservative | gm | 1 |
| Flavor | gm | 3 |
| Glycerin | cc | 600 |
| Propylene glycol | cc | 40 |

Deionized water q.s. ad 1000 cc.

The riboflavin, thiamine hydrochloride, pantothenyl alcohol, nicotinamide, cyanocobalamin, pyridoxine hydrochloride, and saccharin sodium are dissolved in 240 cc. of deionized water. The preservatives and flavors are dissolved in the propylene glycol and glycerin and added to the aqueous solution. The vitamin A palmitate, vitamin D₃, Pluronic F–68 and sorbitan monooleate are dissolved in the corn oil and added to the aqueous solution. Additional deionized water is added to make 1000 cubic centimeters and the mixture stirred until a uniform emulsion results. This preparation is especially useful for oral administration to infants.

EXAMPLE 2

1000 cc. of the composition of the present invention are prepared from the following types and amounts of ingredients:

| Ingredient | | Amount |
|---|---|---|
| Menadione | gm | 1 |
| Vitamin A palmitate | gm | 5.55 |
| Vitamin D₃ | mg | 42 |
| Coconut oil | gm | 10 |
| Riboflavin | gm | 1.66 |
| Thiamine hydrochloride | gm | 1.66 |
| Pantothenyl alcohol | gm | 5 |
| Nicotinamide | gm | 16.66 |
| Pyridoxine hydrochloride | gm | 1.66 |
| Ascorbic acid | gm | 83.33 |
| Cyanocobalamin | mg | 1.66 |
| Pluronic F–68 | gm | 12 |
| Polyoxyethylene lauryl ether | gm | 8 |
| Saccharin sodium | gm | 0.5 |
| Preservative | gm | 1 |
| Flavor | gm | 3 |
| Glycerin | cc | 650 |

Deionized water q.s. ad 1000 cc.

The riboflavin, thiamine hydrochloride, pantothenyl alcohol, nicotinamide, cyanocobalamin, pyridoxine hydrochloride, and saccharin sodium are dissolved in 240 cc. of deionized water. The preservatives and flavors are dissolved in the glycerin and added to the aqueous solution. The vitamin A palmitate, vitamin D₃, menadione, Pluronic F–68 and polyoxyethylene lauryl ether are dissolved in the coconut oil and added to the aqueous solution. Additional deionized water is added to make 1000 cubic centimeters and the mixture stirred until a uniform emulsion results. This preparation is especially useful for oral supplementation of infant diets.

EXAMPLE 3

1000 cc. of the composition of the present invention are prepared from the following types and amounts of ingredients:

| Ingredient | | Amount |
|---|---|---|
| DL-α-tocopherol acetate | gm | 4.47 |
| Corn oil | gm | 6.4 |
| Riboflavin | gm | 1.66 |
| Thiamine hydrochloride | gm | 1.66 |
| Pantothenyl alcohol | gm | 5 |
| Nicotinamide | gm | 16.66 |
| Pyridoxine hydrochloride | gm | 1.66 |
| Ascorbic acid | gm | 83.33 |
| Cyanocobalamin | mg | 1.66 |
| Pluronic F–68 | gm | 7.5 |
| Sorbitan monolaurate | gm | 4.0 |
| Saccharin sodium | gm | 0.5 |
| Preservative | gm | 1 |
| Flavor | gm | 3 |
| Glycerin | cc | 650 |

Deionized water q.s. ad 1000 cc.

The riboflavin, thiamine hydrochloride, pantothenyl alcohol, nicotinamide, cyanocobalamin, pyridoxine hydrochloride, and saccharin sodium are dissolved in 240 cc. of deionized water. The preservatives and flavors are dissolved in glycerin and added to the aqueous solution. The DL-α-tocopherol acetate, Pluronic F–68 and sorbitan monolaurate are dissolved in the corn oil and added to the aqueous solution. Additional deionized water is added to make 1000 cubic centimeters and the mixture stirred until a uniform emulsion results. This preparation is especially useful for oral use in the geriatric field.

EXAMPLE 4

1000 cc. of the composition of the present invention are prepared from the following types and amounts of ingredients:

| Ingredient | | Amount |
|---|---|---|
| Vitamin A palmitate | gm | 5.55 |
| Corn oil | gm | 6.4 |
| Thiamine hydrochloride | gm | 1.66 |
| Pluronic F–68 | gm | 7.5 |
| Sorbitan monooleate | gm | 3.5 |
| Saccharin sodium | gm | 0.5 |
| Preservative | gm | 1 |
| Flavor | gm | 3 |
| Glycerin | cc | 800 |

Deionized water q.s. ad 1000 cc.

The thiamine hydrochloride is dissolved in 50 cc. of deionized water. The preservative and flavor are dissolved in the glycerin and added to the aqueous solution. The vitamin A palmitate, Pluronic F–68, and sorbitan monooleate are dissolved in the corn oil and added to the aqueous solution. Additional deionized water is added to make 1000 cubic centimeters and the mixture stirred until a uniform emulsion results.

It is to be understood that the invention is not to be limited to the exact details of operation or exact compositions shown and described herein as obvious modifications and equivalents will be apparent to one skilled in the art, and the invention is therefore to be limited only by the scope of the appended claims.

What is claimed is:

1. A multiple-vitamin composition consisting of a stable, fluid, oil-in-water emulsion having an oil dispersed phase and an aqueous continuous phase, said composition comprising (1) from about 0.5% to about 2% w./v. of a solution of a nontoxic, orally acceptable oil and at least one oil-soluble vitamin, (2) from about 50 to about 80% v./v. of glycerin, (3) a solution of water and at least one water-soluble vitamin, and (4) from about .75% to about 2% w./v. of an emulsifier comprising (A) an ethylene oxide-polypropylene glycol condensation product having the formula $$HO(C_2H_4O)_a(C_3H_6O)_b(C_2H_4O)_cH$$

wherein the mol-weight of the $(C_2H_4O)$ groups is 60% to 80% of the molecule and $b$ is an integer between 15 and 45, and (B) a member selected from the group consisting of sorbitan monooleate, sorbitan monolaurate, and polyoxyethylene lauryl ether wherein the ratio of $$\left(\frac{A}{B}\right)$$

is from 0.47 to 4.0

2. A multiple-vitamin composition consisting of a stable, fluid oil-in-water emulsion having an oil dispersed phase and an aqueous continuous phase, said composition comprising (1) from about 0.5% to about 2% w./v. of a solution of corn oil and a plurality of oil-soluble vitamins, (2) from about 50 to about 80% v./v. of glycerin, (3) a solution of water and a plurality of water-soluble vitamins, and (4) from about .75 to about 2% w./v. of an emulsifier comprising (A) an ethylene oxide-polypropylene glycol condensation product having the formula $$HO(C_2H_4O)_a(C_3H_6O)_b(C_2H_4O)_cH$$

wherein the mol-weight of the $(C_2H_4O)$ groups is about 80% of the molecule and $b$ is an integer between 25 and 32 and (B) sorbitan monooleate and the ratio of $$\left(\frac{A}{B}\right)$$

is about 2.1.

References Cited in the file of this patent
UNITED STATES PATENTS 2,421,598  Buxton _____ June 3, 1947

OTHER REFERENCES

Benerito: J. Am. Oil Chemists Soc., vol. 33, No. 8, August 1955, pp. 364–367.